May 15, 1962     H. B. STONE     3,035,222

MEANS FOR D.-C. FIELD EXCITATION IN ALTERNATOR SETS

Filed July 16, 1959

INVENTOR.
HOWARD B. STONE,
BY *Allen & Allen*
ATTORNEYS.

3,035,222
MEANS FOR D.-C. FIELD EXCITATION IN ALTERNATOR SETS

Howard B. Stone, Springfield, Ohio, assignor to Robbins & Myers, Inc., Springfield, Ohio, a corporation of Ohio
Filed July 16, 1959, Ser. No. 827,526
1 Claim. (Cl. 322—93)

This invention relates to motor driven alternators such as are used to provide high frequency alternating current for portable tools, grinders, saws, and other high speed induction motors, and relates more particularly to the provision of means for providing the direct current necessary to excite the field of the alternator.

All electric generators or alternators must have a source of unidirectional flux to generate their voltage; and in the majority of such alternators this flux is produced by providing wound coils on the rotating field structure and supplying direct current to these coils. In a conventional alternator set, the alternator is driven by an A.-C. induction motor, and the unidirectional flux is supplied by a small direct current generator which is belted or otherwise coupled to the induction motor, the D.-C. generator thus furnishing the exciting current for the rotating field of the alternator. Such motor-alternator sets find widespread use in industry wherein the various power tools and the like require a different frequency than the normal industrial frequency available.

Accordingly, a principal object of the instant invention is the provision of a simple, efficient and inexpensive motor-alternator set in which the conventional D.-C. generator or exciter is eliminated, the direct current for the field excitation of the alternator being supplied by a rectifier connected through a variable transformer to one leg of the induction motor winding.

A further object of the invention is the provision of a motor-alternator set which need only be connected through a starting switch to the available industrial power supply, which is usually 220 or 440 volts, the proper voltage for the variable transformer and rectifier being obtained by tapping a winding of the induction motor at a point where the desired voltage can be obtained.

The foregoing together with other objects of the invention which will appear hereinafter or which will be apparent to the skilled worker in the art upon reading these specifications, I accomplish by those constructions, circuits and arrangements of parts of which I shall now describe certain exemplary embodiments. Reference is made to the accompanying drawings wherein.

In accordance with the instant invention, the exciting current for the rotating field of the alternator is provided by using a full wave rectifier. However, such rectifier must have an A.-C. power supply and because the alternating voltage may have some variation and also because it may be desirable to vary the direct current to the alternator field, a variable transformer is employed to provide the desired rectifier input. To be practical, such transformer must be small and inexpensive; and the most economical variable transformers operate on 120 volts and a 50/60 cycle input. However, as already indicated, most industrial plants use either 220 or 440 volt current which cannot be used as such to feed the transformer.

In accordance with the instant invention, the required A.-C. power supply is obtained by tapping one leg of the induction motor winding. By selection of various turns at which the winding is tapped, various voltages are made available and, for the purposes of the instant invention, the winding is tapped at a point where about 120 volts is obtained. Consequently, a primary feature of the instant invention is to tap the winding of the induction motor of the alternator set at a point where it will deliver 120 volts, the output so obtained being fed to an inexpensive 120 volt continuous variable transformer which in turn feeds the rectifier to provide direct current for the field excitation of the alternator.

Figure 1:
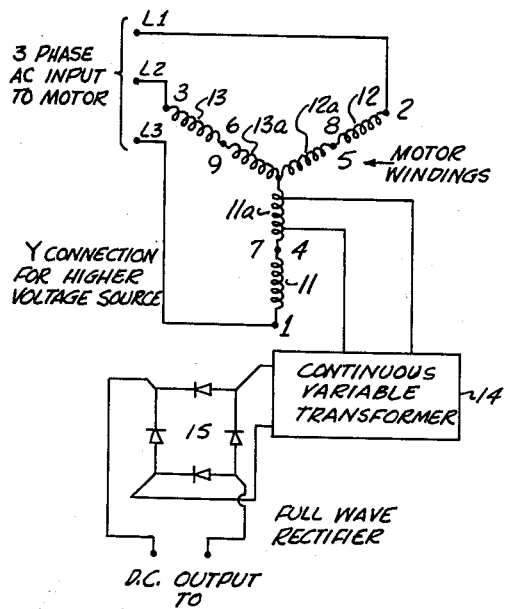
FIGURE 1 is a circuit diagram illustrating the manner in which the exciting current for the alternator is obtained from a Y connected polyphase motor, the connection shown being that employed for a high voltage source, such as 440 volts.
Figure 2:
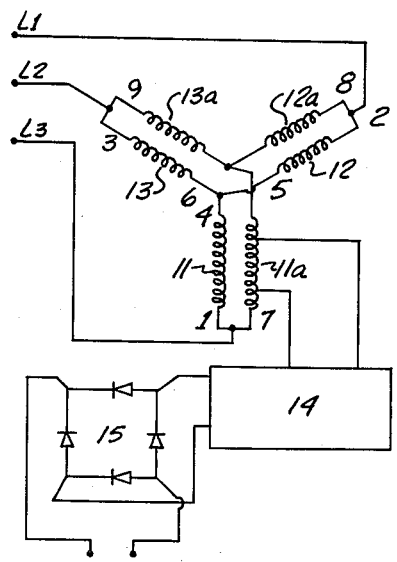
FIGURE 2 is a circuit diagram similar to FIGURE 1 illustrating a Y connection for lower voltage sources, such as 220 volts.

Since induction motors are normally built for operation on either 220 or 440 supply voltages, they are normally provided with nine leads by means of which the installing electrician is able to match the motor to the available supply voltage. In accordance with the instant invention, the motor winding is tapped in such a way that the rectifier supply voltage will be the same irrespective of whether the motor is operated on the higher or the lower voltage supply. In this connection, reference is now made to FIGURE 1 of the drawings which diagrammatically illustrate the manner in which the transformer and rectifier are tapped to a Y connected motor in which the windings are connected for a high voltage source. As seen therein, the nine leads of the motor windings are indicated by the reference numerals 1 through 9, with the three-phase A.-C. source connected to the primary leads at 1, 2 and 3, respectively. For higher voltage input (440 volts) the windings 11—11a, 12—12a, and 13—13a are connected in series. The variable transformer 14, which feeds the rectifier 15, is connected to the winding 11a, the turns at which the winding is tapped being selected to provide the desired voltage which, as already indicated, is preferably 120 volts. It will be understood, of course, that the direct current output of the rectifier 15 will be utilized to furnish the exciting current for the rotating field of the alternator, which is not shown.

Where a lower voltage source is employed, such as 220 volts, the nine leads of the polyphase motor will be connected in the manner illustrated in the diagram of FIGURE 2, wherein it will be seen that the windings 11—11a, 12—12a, 13—13a are arranged in parallel. It will be noted, however, that the transformer 14 remains tapped to the windings 11a, as before; and consequently the rectifier supply voltage will be the same irrespective of whether the motor is operated on the higher or the lower voltage supply.

Figure 3:
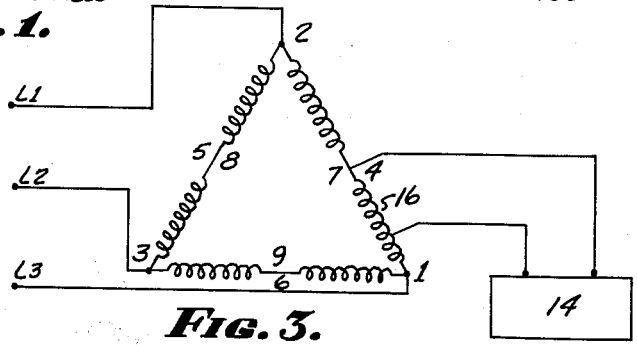
FIGURE 3 is a fragmentary circuit diagram illustrating the invention as applied to a delta connected three-phase driving motor wired for a high voltage source.
Figure 4:
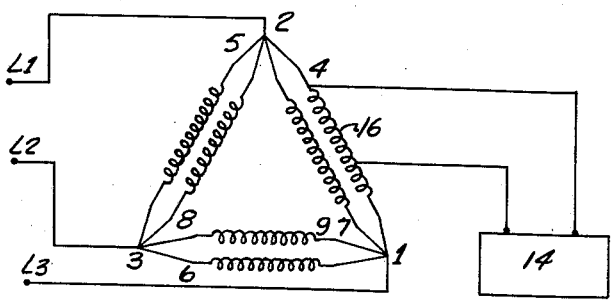
FIGURE 4 is a fragmentary circuit diagram similar to FIGURE 3 but illustrating a delta connection for lower voltage sources.

FIGURES 3 and 4 of the drawings illustrate the application of the invention to three-phase delta connected driving motors. The motor windings may be connected either in series (FIGURE 3) for connection to the higher voltage source, or they may be connected in parallel (FIGURE 4) for connection to the lower voltage source. In either event, the rectifier 14 will be tapped to the turns of winding 16 which will supply the required A.-C. voltage to the transformer 14.

In accordance with the foregoing, I am able to provide a motor-alternator set which eliminates the need for a separate direct current generator or exciter to supply direct current to the alternator, the current being supplied instead by a relatively inexpensive and small transformer which need have a range only broad enough to provide the necessary control for the rectifier which, in turn, controls the output of the alternator. By this expedient, I am able to provide a simple and efficient unit which is operable on the available power source to the elimination of expensive components heretofore necessary in such units.

It will be understood that modifications may be made in the invention without departing from the spirit of it. For example, it should be evident that the principles of the invention are equally applicable to single-phase motors; and consequently I do not intend to limit the scope of the invention excepting as set forth in the claim which follows.

I claim:

In a motor alternator set having an alternating current motor arranged to rotate the field structure of an alternator, said motor having a stator composed of a plurality of windings arranged in legs each composed of a first winding and a second winding, means for selectively connecting the first and second windings in each leg in series or in parallel, whereby to selectively accommodate said motor to an available supply voltage of either 440 or 220 volts, and means for supplying direct current to excite the field of said alternator, said means comprising a 120 volt variable transformer and a rectifier, said transformer being permanently connected to one only of the windings in one of said legs at points effective to supply an input voltage of 120 volts to said transformer, the output of said transformer being connected to said rectifier which, in turn, is connected to said alternator to supply direct current voltage to the field thereof, whereby the rectifier supply voltage will be the same irrespective of whether the motor is operated on a 440 or 220 voltage supply.

References Cited in the file of this patent

UNITED STATES PATENTS

| | | |
|---|---|---|
| 2,377,930 | Fuller | June 12, 1945 |
| 2,707,763 | Kurtz | May 3, 1955 |
| 2,779,906 | Adriansen | Jan. 29, 1957 |
| 2,785,324 | Manney et al. | Mar. 12, 1957 |